Nov. 18, 1930.  P. J. SHRUM  1,782,150
VALVE PROTECTOR
Filed March 1, 1928   2 Sheets-Sheet 1
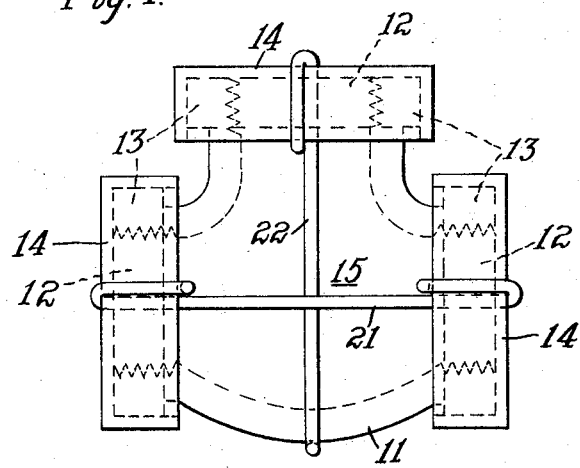
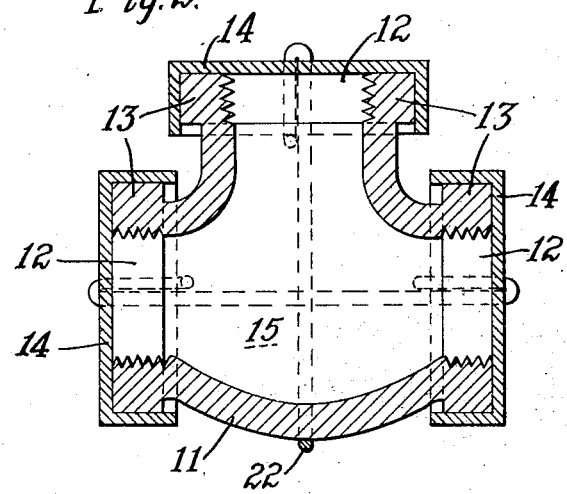
INVENTOR.
Peter J. Shrum
BY Green & McCallister
His ATTORNEYS.

Nov. 18, 1930.  P. J. SHRUM  1,782,150
VALVE PROTECTOR
Filed March 1, 1928   2 Sheets-Sheet 2
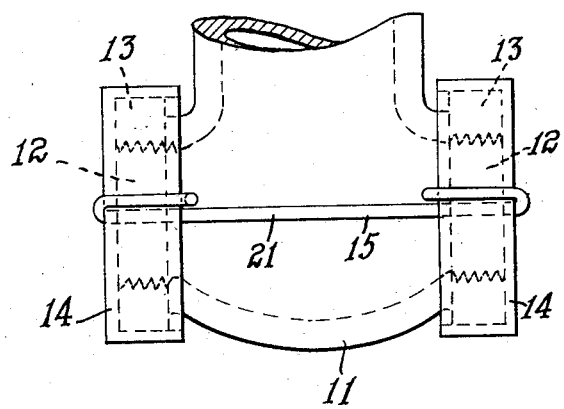
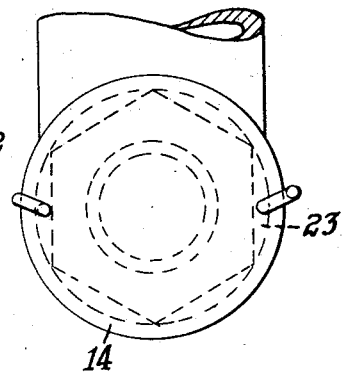
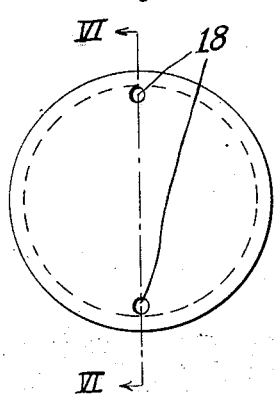
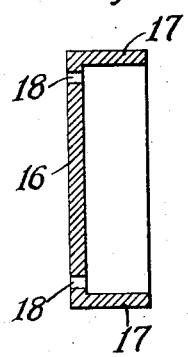
INVENTOR.
Peter J. Shrum
BY Green & McCallister
His ATTORNEYS.

Patented Nov. 18, 1930

1,782,150

UNITED STATES PATENT OFFICE

PETER J. SHRUM, OF MONACA HEIGHTS, PENNSYLVANIA, ASSIGNOR TO PITTSBURGH SCREW AND BOLT CORPORATION, A CORPORATION OF PENNSYLVANIA

VALVE PROTECTOR

Application filed March 1, 1928. Serial No. 258,356.

This invention relates to valve protectors and more particularly to a protector for valve entrances having hexagonal flanges associated therewith.

It is desirable to protect valve openings and their conventional associated flanges from blows, grit and moisture during the transportation of such valves; this is especially so with the larger valves such as gate valves, as the weight of such valves is sufficient to damage the face of its flanges when moved about during shipping; also it is desirable to protect the valve from dirt, moisture and the like. In many cases the openings in valves are internally threaded for the purpose well known to the art; such threads are subjected to dirt and moisture or damaged to such an extent that it is necessary to re-thread the openings after the valves have reached their destination. It is one object of this invention to provide a valve protector that shall protect the valve opening, the threads therein and the flange thereabout, as well as the valve seat, from blows, dirt and moisture during the transportation of such valves.

Another object of this invention is to provide a valve protector which can be produced inexpensively and which can be readily applied to and removed from the valve which will thoroughly protect such valve and which will not come off under the action of continuous chattering or vibration.

Other objects of this invention may be briefly summarized as consisting of certain novel details of construction and combination of parts which will be described in the specification and set forth in the appended claim.

In the accompanying sheets of drawings, Fig. 1 is a side elevational view of a valve having three openings therein and equipped with protectors embodying the invention; Fig. 2 is a sectional view taken through Fig. 1; Fig. 3 is a valve illustrating the manner in which the present protector is applied; Fig. 4 is an elevational end view of Fig. 3; Fig. 5 is an end view of a protector embodying the invention and Fig. 6 is a sectional view taken along the line VI—VI of Fig. 5.

In the drawings 11 is a valve having internally threaded openings 12 therein, each of the openings 12 terminating in a hexagonal flange 13 having a protector 14 disposed thereon and means 15 for maintaining the several protectors in rigid fixed relation with the flanges.

The protector which is preferably stamped from a single piece of sheet metal, comprises a circular portion 16 the edges of which terminate in a continuous annular flange 17 disposed in a plane substantially at right angles to the circular portion 16 form a cup shaped member. The disk or cylindrical portion 16 is provided with diagonally and oppositely disposed openings 18 therethrough adjacent the inner surface of the flange portion 17 for receiving and cooperating with the means 15 for fastening the protectors in operative position.

Figures 1 and 2 show a valve having three internally threaded openings 12, each of the said openings terminating in the conventional hexagonal shaped flange 13, a protector 14 disposed about each of the flanges 13 and the manner in which the means 15 is employed for fastening the protectors in operative position.

The means 15 comprises a suitable wire or bolt adapted to extend through the corresponding openings 18 in oppositely disposed protectors 14, as shown at 21. 22 illustrates one means employing a wire for maintaining a single protector in operative position, the protector 14 being disposed on the flange 13 and having a suitable wire extending through one of the openings 18 around the body of the valve 11 and through the oppositely disposed opening 18 of the protector.

The circular disc portion 16 has a diameter which corresponds to the maximum diameter of the hexagonal flange 13 of the valve to be protected. And, the protector 14 having a continuous annular flange 17 has an inner diameter which corresponds to the above mentioned maximum diameter in order that the cup-shaped protector can be slipped on the flange 13.

It can be seen from the drawings that, since the inner portion of the cup shaped protector 14 is cylindrical and the flange hexagonal, spaces 23 are provided between the inner surface of the annular flange 17 and the sides of the hexagonal flange 13. And, since due to the hexagonal form of the flange 13, the latter has a maximum as well as a minimum diameter, the perforations, holes or openings 18 are drilled in the disc 16 adjacent the smallest diameter of the flange 13 and adjacent the inner diameter of the flange 17 of the cup 14. Thus, the perforations or openings 18 are located adjacent the inner circumference of the continuous annular flange 17 of the cup-shaped protector 14. Such arrangement prevents the fastening means 15 from coming in contact with the inner portion of the valve 11 as well as preventing the openings in the protector from registering with the valve opening and thereby preventing the dust and moisture from seeping into the inner portion of the valve.

Fig. 3 illustrates the valve 11 having oppositely disposed openings 12 and the manner of fastening protectors in rigid fixed relation with such openings which is the same as that shown at 21 in Figs. 1 and 2.

The present protector is quickly and easily attached to or removed from the valves, very simple in design and is inexpensive to manufacture.

While I have illustrated and described the present protector in connection with valves, it will be apparent to those skilled in the art that this protector may be employed for other like articles. Other changes, modifications, substitutions, additions and omissions may be made in the invention without departing from the spirit and scope of the appended claim.

What I claim as new and desire to secure by Letters Patent is:

The combination with a valve having an opening therein, said opening terminating in a hexagonal flange, said opening being internally threaded, of a cup-shaped protector whose diameter corresponds to the maximum diameter of the hexagonal flange and being formed to fit over said flange, said cup-shaped protector having openings adjacent its inner circumference and the smallest diameter of said hexagonal flange, and means for engaging said openings for fastening said protector to the valve.

In testimony whereof, I have hereunto subscribed my name this 25th day of February, 1928.

PETER J. SHRUM.